(12) United States Patent
Tomiyama et al.

(10) Patent No.: US 11,264,003 B2
(45) Date of Patent: Mar. 1, 2022

(54) SOUNDPROOF MEMBER

(71) Applicant: Sumitomo Riko Company Limited, Aichi (JP)

(72) Inventors: Koji Tomiyama, Aichi (JP); Shuka Kitamura, Aichi (JP); Akio Yabu, Aichi (JP); Yuhei Adachi, Aichi (JP); Yasuo Suzuki, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 742 days.

(21) Appl. No.: 16/059,055

(22) Filed: Aug. 9, 2018

(65) Prior Publication Data

US 2018/0374467 A1 Dec. 27, 2018

Related U.S. Application Data

(63) Continuation of application No. PCT/JP2017/006730, filed on Feb. 23, 2017.

(30) Foreign Application Priority Data

Mar. 31, 2016 (JP) .............................. JP2016-072707

(51) Int. Cl.
*G10K 11/162* (2006.01)
*B60R 13/08* (2006.01)
*E04B 1/84* (2006.01)

(52) U.S. Cl.
CPC ........ *G10K 11/162* (2013.01); *B60R 13/0838* (2013.01); *B29K 2995/0008* (2013.01); *E04B 1/84* (2013.01)

(58) Field of Classification Search
CPC ............ B60R 13/0884; B60R 13/0815; B60R 13/0838; F02B 77/11; G10K 11/162
See application file for complete search history.

(56) References Cited

U.S. PATENT DOCUMENTS 3,243,374 A * 3/1966 Gillard .................... C08L 95/00
252/62
4,833,018 A * 5/1989 Ruehl ..................... B32B 11/08
428/332

(Continued)

FOREIGN PATENT DOCUMENTS

DE 112014000293 10/2015
EP 0316744 2/1995

(Continued)

OTHER PUBLICATIONS

"International Search Report (Form PCT/ISA/210)" of PCT/JP2017/006730, dated Apr. 11, 2017, with English translation thereof, pp. 1-3.

(Continued)

*Primary Examiner* — Jeremy A Luks
(74) *Attorney, Agent, or Firm* — JCIPRNET

(57) ABSTRACT

This soundproof member is mounted to a drive device provided with a rotating body and comprises: an elastic member having a base material consisting of a resin or elastomer, the elastic member also having a magnetic filler contained in the base material so as to be interconnected and oriented in one direction; and a mass disposed on a surface with the elastic member provided therebetween, the surface extending in the direction of the rotation axis of the rotating body, the mass being supported by the elastic member.

11 Claims, 6 Drawing Sheets

(56) References Cited

U.S. PATENT DOCUMENTS

| | | | |
|---|---|---|---|
| 5,153,388 A | 10/1992 | Wittenmayer et al. | |
| 9,243,821 B2* | 1/2016 | Hasegawa | B60R 13/0884 |
| 9,551,144 B2 | 1/2017 | Tomiyama et al. | |
| 2005/0000751 A1* | 1/2005 | Sheng | E04B 1/86 |
| | | | 181/290 |
| 2009/0113843 A1 | 5/2009 | Levit et al. | |
| 2014/0345993 A1* | 11/2014 | Tomiyama | F16F 15/08 |
| | | | 188/322.16 |
| 2015/0197933 A1 | 7/2015 | Tomiyama et al. | |
| 2015/0315781 A1* | 11/2015 | Kang | E04B 1/84 |
| | | | 181/286 |

FOREIGN PATENT DOCUMENTS

| | | |
|---|---|---|
| JP | H0671938 | 10/1994 |
| JP | H06100245 | 12/1994 |
| JP | 2009235979 | 10/2009 |
| JP | 2015069012 | 4/2015 |

OTHER PUBLICATIONS

"Written Opinion of the International Searching Authority (Form PCT/ISA/237)" of PCT/JP2017/006730, dated Apr. 11, 2017, with English translation thereof, pp. 1-7.

"Office Action of Germany Counterpart Application", dated Nov. 16, 2020, with English translation thereof, p. 1-p. 13.

\* cited by examiner

SOUNDPROOF MEMBER

CROSS-REFERENCE TO RELATED APPLICATION

The present application is a continuation of PCT/JP2017/006730, filed on Feb. 23, 2017, and is related to and claims priority from Japanese patent application no. 2016-072707, filed on Mar. 31, 2016. The entire contents of the aforementioned application are hereby incorporated by reference herein.

TECHNICAL FIELD

The present disclosure relates to a soundproof member mounted on a driving device including a rotating body.

BACKGROUND ART

Inside an engine compartment, components that may serve as a noise source such as an engine, a motor, and an exhaust gas recirculation (EGR) valve are accommodated. In order to reduce the noise that is generated from such components, sound absorbing components and vibration absorbing components made of a foamed substance such as a polyurethane foam may be deployed. However, a foamed substance has low thermal conductivity because it includes a plurality of cells (bubbles) therein. Therefore, when these components are disposed around an engine and a motor that generate heat, there is a risk of heat accumulation, which causes problems. Thus, when a foamed substance is used as a sound absorbing component, it is necessary to improve heat dissipation therefrom. In this regard, Patent Literature 1 discloses a sound absorbing cover made of a foamed substance containing a magnetic filler. In the sound absorbing cover described in Patent Literature 1, a magnetic filler having high thermal conductivity is aligned in a thickness direction of the sound absorbing cover. Therefore, not only can noise be reduced, but heat of a counterpart member can also be quickly released through the aligned magnetic filler.

When a driving device including a rotating body such as a motor is driven, high-frequency radiated sound and low-frequency solid-borne sound are generated. In addition, when a rotation direction and a rotational speed of the motor change, a frequency of the noise changes. The sound absorbing cover using the foamed substance described in Patent Literature 1 is effective in reducing high frequency noise from the motor. However, an effect of reducing noise with a low frequency of 500 Hz or less such as solid-borne sound is weak.

On the other hand, a dynamic damper is known as a device configured to reduce vibration. In general, a dynamic damper is configured so that a mass is elastically supported on a vibrating body whose vibration is to be controlled via an elastic body such as a rubber body. When the vibrating body vibrates at a specific frequency, the mass and the elastic body constitute a vibration system including a mass-spring and resonate, and absorb and reduce the vibration of the vibrating body. However, according to a dynamic damper of the related art, it is necessary to attach it to a vibrating body in a vibration direction, and it is necessary to adjust a resonance frequency of the dynamic damper to a resonance frequency of the vibrating body. In addition, the dynamic damper of the related art is effective in reducing low-frequency noise, but is not able to reduce high frequency noise. In addition, a frequency band relating to reduction is narrow so that a sufficient noise reduction effect may not be able to be obtained for an object whose frequency changes, for example, when a rotation direction and a rotational speed of the motor change.

CITATION LIST

Patent Literature

[Patent Literature 1]:
  Japanese Unexamined Patent Application Publication No. 2015-069012
[Patent Literature 2]:
  Japanese Examined Patent Application Publication No. H6-100245
[Patent Literature 3]:
  Japanese Unexamined Utility Model Application Publication No. H6-71938

SUMMARY (1) A soundproof member of the present disclosure is a soundproof member that is mounted on a driving device including a rotating body, which includes an elastic member including a base material made of a resin or an elastomer and a magnetic filler that is linked and aligned in one direction in the base material; and a mass that is disposed on a surface that extends in a rotation axis direction of the rotating body with the elastic member therebetween, and the mass is supported by the elastic member.
(2) In some embodiments, in the configuration of (1), when the rotation axis direction of the rotating body in the driving device is defined as an X direction, and in the two directions orthogonal to the X direction, a horizontal direction is defined as a Y direction, and a vertical direction is defined as a Z direction, the mass is disposed on an X-Z plane or a X-Y plane of the driving device with the elastic member therebetween.
(3) In some embodiments, in the configuration of (2), a resonance frequency of the driving device in the Y direction is different from a resonance frequency in the Z direction, when the mass is disposed on the X-Z plane, a resonance frequency of the soundproof member in the Z direction matches the resonance frequency of the driving device in the Y direction, and when the mass is disposed on the X-Y plane, a resonance frequency of the soundproof member in the Y direction matches the resonance frequency of the driving device in the Z direction.
(4) In some embodiments, in the configuration of (2) or (3), vibration damping frequencies of the driving device in the Y direction and the Z direction are 500 Hz or less.
(5) In some embodiments, in the configuration of any of (2) to (4), the magnetic filler contained in the elastic member is linked and aligned in the Y direction.
(6) In some embodiments, the configuration of any of (1) to (5) further includes a cover member that covers the elastic member and the mass.

DESCRIPTION OF EMBODIMENTS

Figure 1:
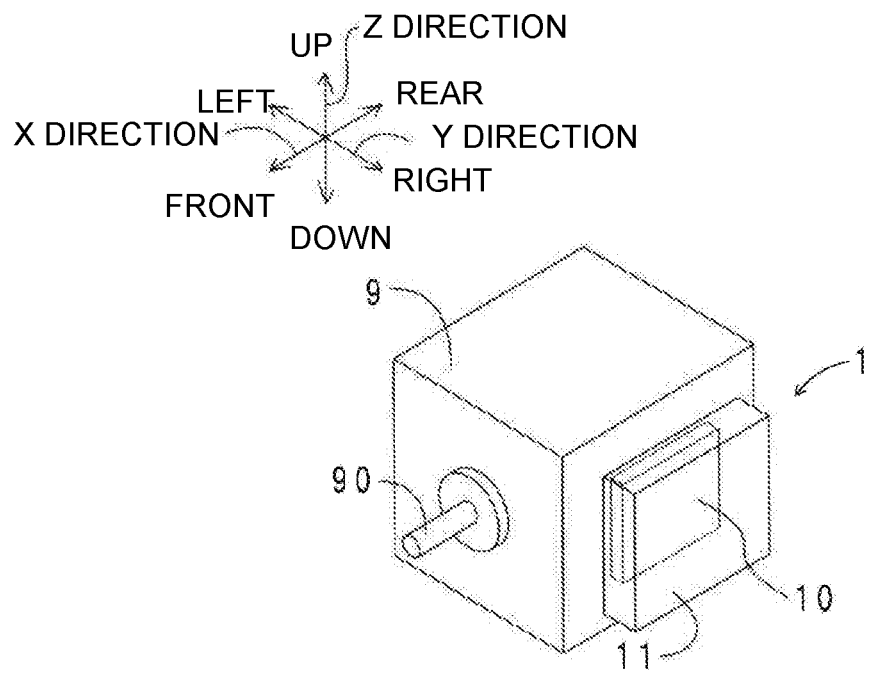
FIG. 1 is a perspective view of a motor on which a soundproof member of a first embodiment is mounted.

The present disclosure provides a soundproof member through which it is possible to reduce noise in a wide frequency band from a high frequency to a low frequency when it is mounted on a driving device including a rotating body such as a motor.

The soundproof member of the present disclosure includes the elastic member including a base material made of a resin or an elastomer and an aligned magnetic filler. Thus, radiated sound from the driving device is absorbed and blocked and heat generated from the driving device is quickly released. In addition, the soundproof member of the present disclosure includes a mass that is supported by the elastic member. Accordingly, it is possible to obtain a vibration isolation effect according to a so-called mass-spring. Thus, according to the soundproof member of the present disclosure, when a vibration isolating function according to the mass-spring is added to a sound absorbing and sound insulating function according to the elastic member, it is possible to realize both reduction in a radiated sound that propagates through the air and reduction in solid-borne sound. That is, according to the soundproof member of the present disclosure, it is possible to not only reduce high frequency noise such as a radiated sound but also reduce noise with a low frequency of 500 Hz or less that propagates through a solid.

In the soundproof member of the present disclosure, it is possible to change a natural frequency of the soundproof member by changing a spring constant of the elastic member. In addition, it is also possible to change a natural frequency by changing a mass of the mass. Therefore, according to the soundproof member of the present disclosure, tuning may become easier in response to a frequency of a vibration to be reduced.

In this specification, the elastomer includes crosslinked rubbers and thermoplastic elastomers. In addition, the resin and the elastomer may be a foamed substance or a solid body.

In the driving device including a rotating body, noise is generated mainly in two directions (Y direction and Z direction) orthogonal to the rotation axis direction. The X-Z plane of the driving device is a surface perpendicular to the Y direction. The X-Y plane of the driving device is a surface perpendicular to the Z direction. According to the present configuration, since the mass is disposed on the X-Z plane or the X-Y plane, it is possible to effectively reduce low-frequency noise that propagates in the Y direction and the Z direction.

As a result of studies performed by the inventors, it was found that, in the driving device including a rotating body, resonance frequencies in two directions (Y direction and Z direction) orthogonal to the rotation axis direction were different from each other. For example, in order to reduce vibration in the Y direction, conventionally, a mass is disposed on the X-Z plane perpendicular to the Y direction and resonance frequencies in the Y direction are matched. In order to reduce vibration in the Z direction, conventionally, a mass is disposed on the X-Y plane perpendicular to the Z direction, and resonance frequencies in the Z direction are matched. On the other hand, in this configuration, a mass is disposed on the X-Z plane and a resonance frequency in the Z direction approaches a resonance frequency of the driving device in the Y direction. Alternatively, a mass is disposed on the X-Y plane and a resonance frequency in the Y direction approaches a resonance frequency of the driving device in the Z direction. In this manner, when the soundproof member of the present disclosure is designed so that resonance frequencies in directions 90° apart from each other in the soundproof member and the driving device match, it is possible to reduce vibration in both directions including the Y direction and the Z direction. Thus, the attachment position of the soundproof member has a high degree of freedom. In addition, tuning may become easier in response to a frequency of a vibration to be reduced. Here, when it is described that resonance frequencies "match" in the present configuration, this means that one resonance frequency is within a range of ±10% of the other resonance frequency.

As described above, noise is generated mainly two directions including the Y direction and the Z direction from the driving device including a rotating body. Therefore, vibration with a frequency of 500 Hz or less in these two directions is reduced and thus a noise reduction effect of the driving device can be stronger.

In the elastic member of the present configuration, according to alignment of the magnetic filler, a spring constant in the Y direction and a spring constant in the Z direction are different from each other. This configuration is effective in reducing noise of a driving device in which a resonance frequency in the Y direction and a resonance frequency in the Z direction are different from each other. In addition, in the Y direction which is the same as the alignment direction of the magnetic filler, a spring constant is larger than in the Z direction. Thus, a natural frequency is higher in the Y direction than in the Z direction. On the other hand, a spring constant is smaller in the Z direction than in the Y direction. Therefore, a natural frequency is lower in the Z direction than in the Y direction. According to the present configuration, it is possible to easily adjust a resonance frequency using a difference between spring constants in the Y direction and the Z direction.

According to the present configuration, a part or all of the driving device is covered by the cover member. Thus, the sound insulating effect can be stronger and noise can be further reduced. In addition, the elastic member and the mass can be fixed using the cover member. For example, the elastic member and the mass can be fixed by pressing of the cover member without using an adhesive or the like.

According to the present configuration, the elastic member and the cover member become a composite spring and a vibration isolation effect according to the mass-spring can be obtained. For example, when the cover member is made of an elastomer, a resonance frequency can be adjusted by changing the elastic modulus of the cover member. Therefore, compared to a case in which a cover member is made of a metal or a resin, a range of a resonance frequency that can be adjusted can be widened. In addition, when the cover member is made of an elastomer, even if a secondary radiated sound is generated according to eigenvalue vibration of the cover member, it is possible to reduce an influence thereof by adjusting an eigenvalue of the cover member to a low-frequency band in which auditory sensitivity is low, for example, 100 Hz or less. In addition, it is possible to reduce generation of a secondary radiated sound according to a damping effect of the elastomer.

Soundproof members according to embodiments of the present disclosure will be described below.

First Embodiment

[Configuration]

Figure 2:
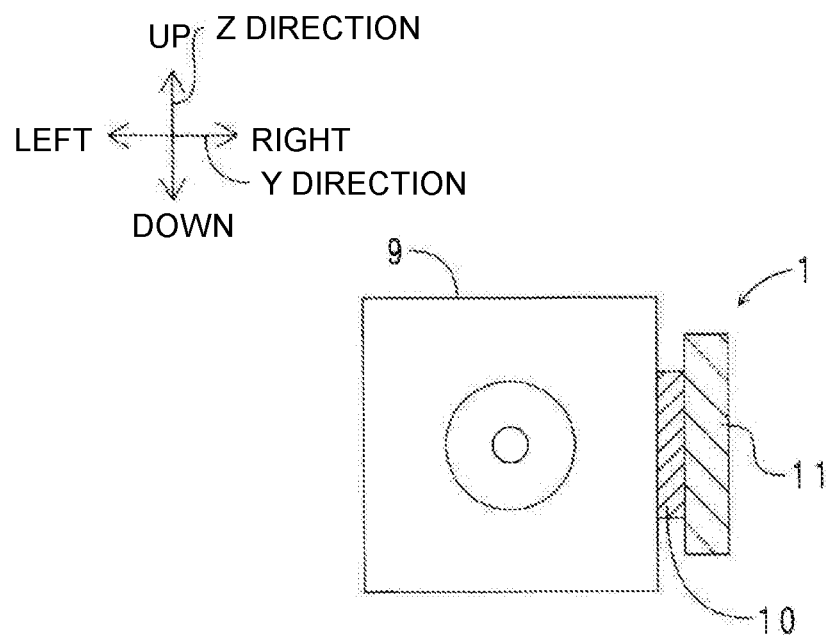
FIG. 2 is a front view of the motor.
Figure 3:
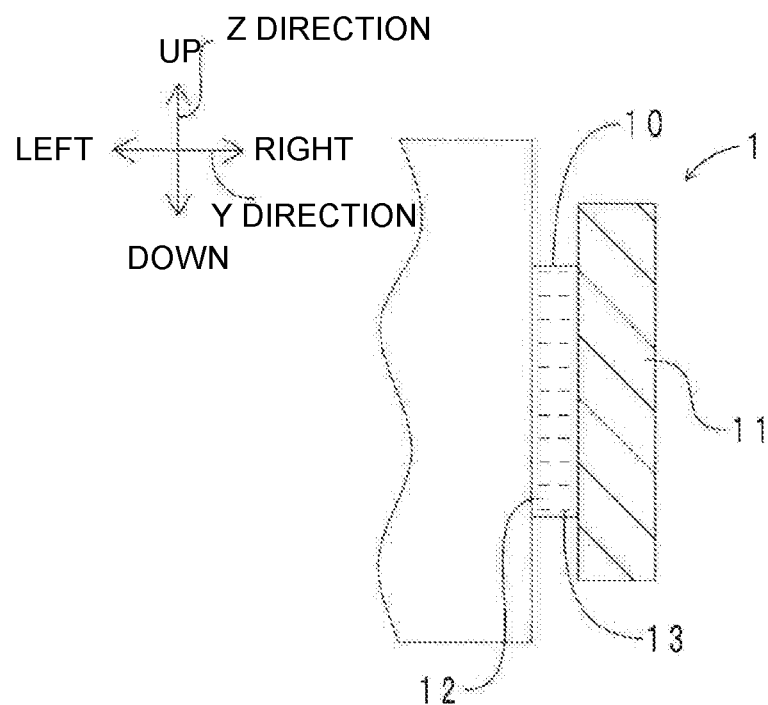
FIG. 3 is a schematic diagram showing an alignment state of a magnetic filler in an elastic member of the soundproof member.

First, a configuration of a soundproof member of the present embodiment will be described. FIG. 1 is a perspective view of a motor on which a soundproof member of the present embodiment is mounted. FIG. 2 is a front view of the motor. FIG. 3 schematically shows an alignment state of a magnetic filler in an elastic member of the soundproof member. For convenience of description, in FIG. 1, the elastic member is shown as being transparent. FIG. 2 and FIG. 3 show cross sections of only a soundproof member in an up and down direction. In FIG. 3, hatching of the elastic member is omitted. In FIG. 1 to FIG. 3, a rotation axis direction (front and rear direction) of the motor is defined as an X direction, a horizontal direction (left and right direction) from two directions orthogonal to the X direction is defined as a Y direction, and a vertical direction (up and down direction) is defined as a Z direction.

As shown in FIG. 1 and FIG. 2, a motor 9 includes a rotation shaft 90. The motor 9 is included in the concept of "a driving device including a rotating body" in the present disclosure. A soundproof member 1 is attached to a right surface (X-Z plane) of the motor 9. The right surface (X-Z plane) of the motor 9 is included in the concept of "surface that extends in the rotation axis direction" in the present disclosure. A resonance frequency in the left and right direction (Y direction) of the motor 9 and a resonance frequency in the up and down direction (Z direction) are different from each other. The resonance frequency of the soundproof member 1 in the Z direction is designed to match the resonance frequency (vibration damping frequency) of the motor 9 in the Y direction. The vibration damping frequency of the soundproof member 1 is 500 Hz or less. The soundproof member 1 includes an elastic member 10 and a mass 11.

The elastic member 10 is adhered to the right surface (X-Z plane) of the motor 9. The elastic member 10 has a rectangular plate shape. As shown in FIG. 3, the elastic member 10 include a base material 12 made of a polyurethane foam and composite particles 13 obtained by mixing graphite particles and stainless steel particles. The composite particles 13 are included in the concept of a magnetic filler in the present disclosure. The composite particles 13 are aligned so that they are continuous in the left and right direction (Y direction). Spring constants of the elastic member 10 differ in the left and right direction (Y direction) and the up and down direction (Z direction). The spring constant of the elastic member 10 in the Y direction is 501.0 N/mm and the spring constant of the elastic member 10 in the Z direction is 87.8 N/mm.

The mass 11 is adhered to the right surface of the elastic member 10 and is supported by the elastic member 10. That is, the mass 11 is disposed on the right surface (X-Z plane) of the motor 9 with the elastic member 10 therebetween. The mass 11 is made of iron and has a rectangular plate shape. The mass of the mass 11 is 25 g.

[Operations and Effects]

Next, operations and effects of the soundproof member of the present embodiment will be described. The soundproof member 1 includes an elastic member containing the base material 12 made of a polyurethane foam and the aligned composite particles 13. The composite particles 13 are linked and aligned in a direction (Y direction) perpendicular to the right surface of the motor 9. Thus, a radiated sound from the motor 9 is absorbed and blocked and heat generated from the motor 9 is released quickly. In addition, the soundproof member 1 includes the mass 11 supported by the elastic member 10. Thus, it is possible to obtain a vibration isolation effect using the mass-spring. Thus, according to the soundproof member 1, it is possible to reduce both radiated sound and solid-borne sound generated in the motor 9. That is, according to the soundproof member 1, it is possible to reduce not only high-frequency noise but also noise with a low frequency of 500 Hz or less.

In addition, noise is generated from the motor 9 mainly in two directions (Y direction and Z direction) orthogonal to the rotation axis direction. Here, the soundproof member 1 is attached to the right surface (X-Z plane) which is a surface perpendicular to the motor 9 in the Y direction. More specifically, the mass 11 is disposed on the right surface (X-Z plane) of the motor 9 with the elastic member 10 therebetween. Thus, it is possible to effectively reduce low-frequency noise propagating in the Y direction and the Z direction.

In the soundproof member 1, the mass 11 is disposed on the X-Z plane of the motor 9, and a resonance frequency in the Z direction matches a resonance frequency of the motor 9 in the Y direction. The soundproof member 1 is designed so that a resonance frequency in a direction shifted by 90° matches the resonance frequency of the motor 9, and thus it is possible to reduce vibration in both directions including the Y direction and the Z direction.

A natural frequency of the soundproof member 1 can be easily changed by changing a spring constant of the elastic member 10 or the mass of the mass 11. Therefore, in the soundproof member 1, tuning may become easier in response to a frequency to be reduced. In addition, a spring constant of the elastic member 10 is different between the Y direction and the Z direction. Thus, resonance frequencies are easily made to match for the motor 9 in which a resonance frequency in the Y direction and a resonance frequency in the Z direction are different from each other. In addition, a vibration damping frequency of the soundproof member 1 is 500 Hz or less. Since vibration with a frequency of 500 Hz or less is reduced, a noise reduction effect of the driving device is strong.

Second Embodiment

Figure 4:
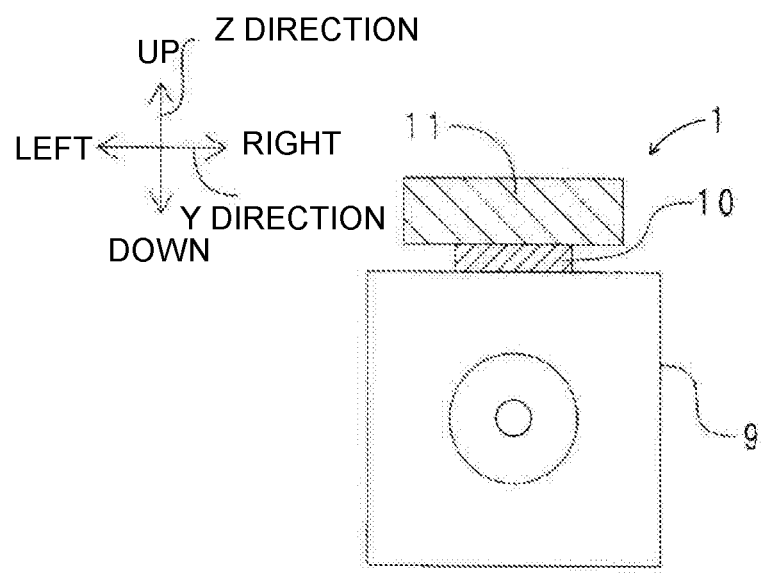
FIG. 4 is a front view of a motor on which a soundproof member of a second embodiment is mounted.
Figure 5:
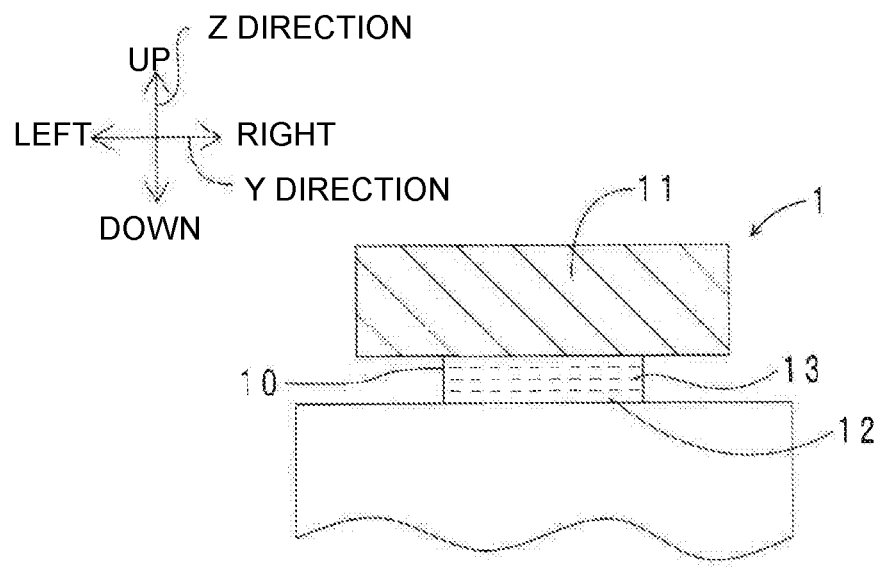
FIG. 5 is a schematic diagram showing an alignment state of a magnetic filler in an elastic member of the soundproof member.

Main differences between a soundproof member of the present embodiment and the soundproof member of the first embodiment are that attachment positions of the soundproof member and alignment direction of the magnetic filler contained in the elastic member are different from each other. Here, description will focus on these differences. FIG. 4 shows a front view of a motor on which the soundproof member of the present embodiment is mounted. FIG. 5 schematically shows an alignment state of a magnetic filler in an elastic member of the soundproof member. For convenience of description, in FIG. 4 and FIG. 5, cross sections of only the soundproof member in the up and down direction are shown. In FIG. 5, hatching of the elastic member is omitted. FIG. 4 and FIG. 5 correspond to FIG. 2 and FIG. 3 described above.

As shown in FIG. 4, the soundproof member 1 is attached to the upper surface (X-Y plane) of the motor 9. The upper surface (X-Y plane) of the motor 9 is included in the concept of "surface that extends in the rotation axis direction" in the present disclosure. A resonance frequency of the soundproof member 1 in the Y direction is designed to match a resonance frequency (vibration damping frequency) of the motor 9 in the Z direction. The vibration damping frequency of the soundproof member 1 is 500 Hz or less.

The elastic member 10 is adhered to an upper surface (X-Y plane) of the motor 9. The elastic member 10 has a rectangular plate shape. A size of the elastic member 10 in the planar direction, that is, an area in contact with the soundproof member 1, is slightly smaller than that of the elastic member of the first embodiment. As shown in FIG. 5, the composite particles 13 contained in the elastic member 10 are aligned so that they are continuous in the left and right direction (Y direction). A spring constant of the elastic member 10 is different between the left and right direction (Y direction) and the up and down direction (Z direction). A spring constant of the elastic member 10 in the Y direction is 38.4 N/mm and a spring constant in the Z direction is 89.0 N/mm.

The mass 11 is adhered to the upper surface of the elastic member 10 and is supported on the elastic member 10. That is, the mass 11 is disposed on the upper surface (X-Y plane) of the motor 9 with the elastic member 10 therebetween. The mass 11 is made of iron and has a rectangular plate shape. The mass of the mass 11 is 56 g.

Regarding parts having the same configuration, the soundproof member of the present embodiment has the same operations and effects as the soundproof member of the first embodiment. The soundproof member 1 of the present embodiment is attached to the upper surface (X-Y plane) which is a surface perpendicular to the motor 9 in the Z direction. More specifically, the mass 11 is disposed on the upper surface (X-Y plane) of the motor 9 with the elastic member 10 therebetween. Thus, it is possible to effectively reduce noise with a low frequency that propagates in the Y direction and the Z direction. In the soundproof member 1, the mass 11 is disposed on the X-Y plane of the motor 9 and a resonance frequency in the Y direction matches a resonance frequency of the motor 9 in the Z direction. The soundproof member 1 is designed so that a resonance frequency in a direction shifted by 90° matches the resonance frequency of the motor 9, and thus it is possible to reduce vibration in both directions including the Y direction and the Z direction.

Third Embodiment

Figure 6:
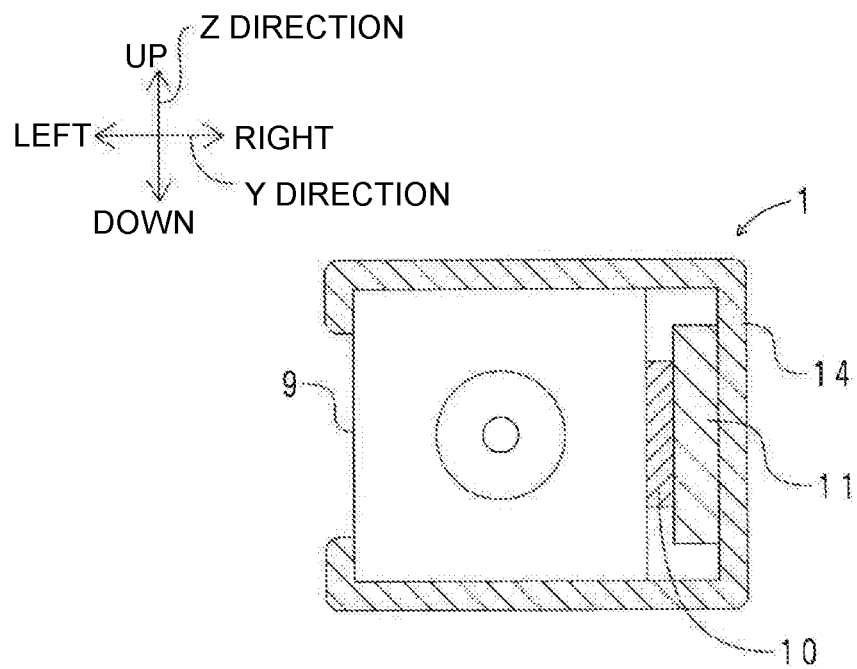
FIG. 6 is a front view of a motor on which a soundproof member of a third embodiment is mounted.

A main difference between a soundproof member of the present embodiment and the soundproof member of the first embodiment is that a cover member is included. Here, description will focus on this difference. FIG. 6 shows a front view of a motor on which the soundproof member of the present embodiment is mounted. For convenience of description, FIG. 6 shows a cross section of only the soundproof member in the up and down direction (this similarly applies to FIG. 7 to FIG. 9). FIG. 6 corresponds to FIG. 2 described above.

As shown in FIG. 6, the soundproof member 1 includes the elastic member 10, the mass 11, and a cover member 14. The cover member 14 is made of an acrylonitrile-butadiene-styrene (ABS) resin. The cover member 14 covers the upper surface, the right surface (including the elastic member 10 and the mass 11), and the bottom surface of the motor 9 from the outside and has an inverted C shape when viewed from the front side (ahead).

Regarding parts having the same configuration, the soundproof member of the present embodiment has the same operations and effects as the soundproof member of the first embodiment. According to the soundproof member 1 of the present embodiment, the elastic member 10 and the mass 11 can be fixed by pressing of the cover member 14. Thus, the soundproof member 1 is easily attached without an adhesive for fixing the elastic member 10 and the mass 11. A sound insulating function is imparted by the cover member 14. Thus, an effect of reducing high-frequency noise is stronger. The elastic member 10 and the cover member 14 become a composite spring. Thus, a range of a resonance frequency that can be adjusted increases, for example, a spring constant is easily reduced compared to when only the elastic member 10 is used. The cover member 14 is made of an ABS resin. Thus, it is lightweight and easily formed.

Fourth Embodiment

Figure 7:
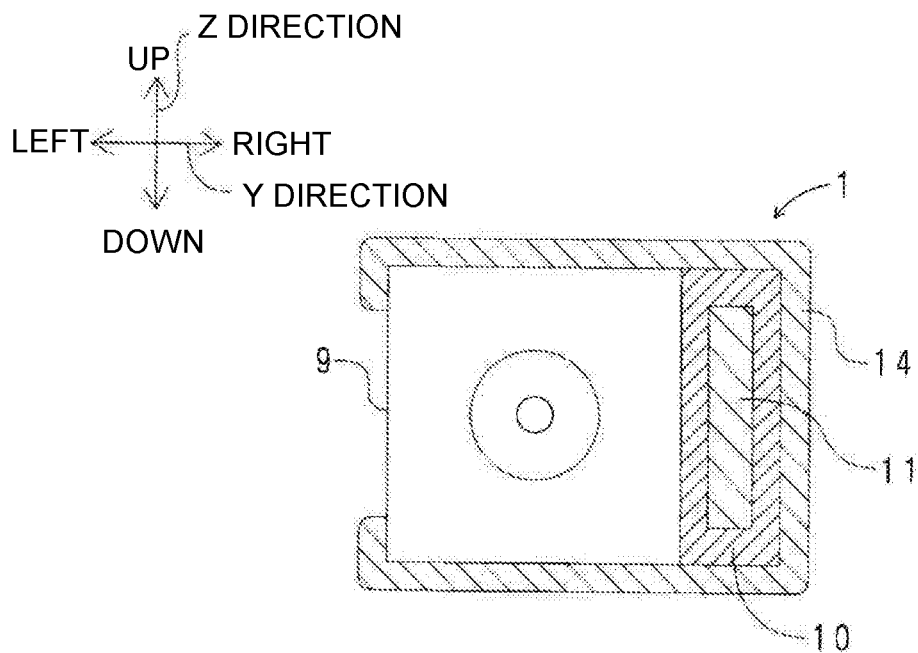
FIG. 7 is a front view of a motor on which a soundproof member of a fourth embodiment is mounted.

A main difference between a soundproof member of the present embodiment and the soundproof member of the third embodiment is that a disposition form of the elastic member is changed. Here, description will focus on this difference. FIG. 7 shows a front view of a motor on which the soundproof member of the present embodiment is mounted. FIG. 7 corresponds to FIG. 6 described above.

As shown in FIG. 7, the elastic member 10 includes the mass 11 therein and is adhered to the right surface (X-Z plane) of the motor 9. The elastic member 10 covers the entire perimeter of the mass 11. Regarding parts having the same configuration, the soundproof member of the present embodiment has the same operations and effects as the soundproof member of the third embodiment. According to the soundproof member 1 of the present embodiment, since a contact area between the elastic member 10 and the motor 9 is large, a sound absorption and sound insulating effect is improved and heat dissipation is improved.

Fifth Embodiment

Figure 8:
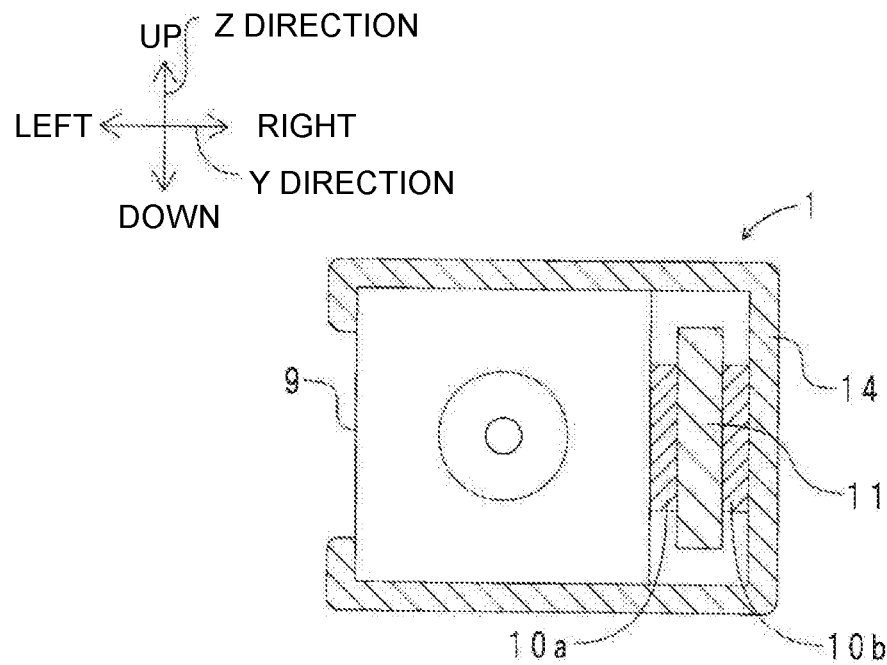
FIG. 8 is a front view of a motor on which a soundproof member of a fifth embodiment is mounted.

A main difference between a soundproof member of the present embodiment and the soundproof member of the third embodiment is that a disposition form of the elastic member is changed. Here, description will focus on this difference. FIG. 8 shows a front view of a motor on which the soundproof member of the present embodiment is mounted. FIG. 8 corresponds to FIG. 6 described above.

As shown in FIG. 8, a pair of elastic members 10a and 10b are disposed on both sides of the mass 11 in the left and right direction. The pair of elastic members 10a and 10b each have a rectangular plate shape. The elastic member 10a is adhered to the right surface (X-Z plane) of the motor 9 and the mass 11. The elastic member 10b is adhered to the cover member 14 and the mass 11. Regarding parts having the same configuration, the soundproof member of the present embodiment has the same operations and effects as the soundproof member of the third embodiment. According to the soundproof member 1 of the present embodiment, two elastic members are provided and thus a range of a resonance frequency that can be adjusted can be increased.

Sixth Embodiment

Figure 9:
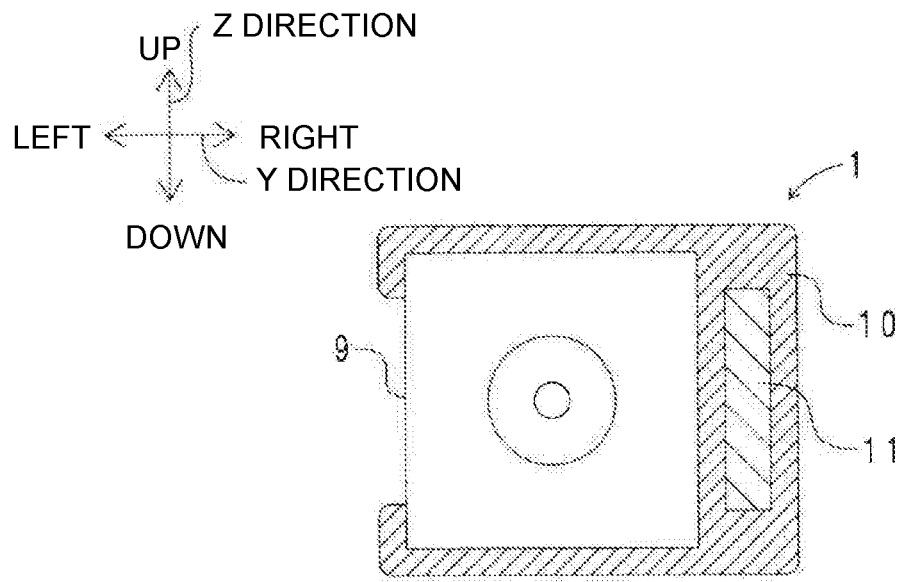
FIG. 9 is a front view of a motor on which a soundproof member of a sixth embodiment is mounted.

A main difference between a soundproof member of the present embodiment and the soundproof member of the first embodiment is that a disposition form of the elastic member is changed. Here, description will focus on this difference. FIG. 9 shows a front view of a motor on which the soundproof member of the present embodiment is mounted. FIG. 9 corresponds to FIG. 2 described above.

As shown in FIG. 9, the soundproof member 1 includes the elastic member 10 and the mass 11, but does not include a cover member. The elastic member 10 covers the upper surface, the right surface (including the mass 11), and the bottom surface of the motor 9 from the outside and has an inverted C shape when viewed from the front side (ahead). The elastic member 10 is adhered to the upper surface, the right surface, and the bottom surface of the motor 9. The mass 11 disposed on the right side of the motor 9 is included in the elastic member 10. Regarding parts having the same configuration, the soundproof member of the present embodiment has the same operations and effects as the soundproof member of the first embodiment. According to the soundproof member 1 of the present embodiment, since a contact area between the elastic member 10 and the motor 9 is large, a sound absorption and sound insulating effect is improved and heat dissipation is improved. In addition, it is easy to attach the soundproof member 1 and it is effective in reducing costs and reducing the weight.

<Others>

One form of the soundproof member of the present disclosure has been described above. However, the embodiment is not particularly limited to this form. The disclosure can be realized according to various modified forms and improved forms that can be realized by those skilled in the art.

In the above embodiment, the soundproof member of the present disclosure is mounted on a motor. However, the driving device on which the soundproof member of the present disclosure is mounted is not limited to the above embodiment. For example, the soundproof member of the present disclosure may be mounted on a gear case, a pump, an electromagnetic valve, a relay, an injector, a compressor, and the like.

The elastic member and the mass may be fixed using an adhesive, dual-sided tape, or the like. In addition, they may be crimped by a cover member. When the cover member is deployed, the elastic member and the mass may be fixed using an adhesive, dual-sided tape, or the like.

A material, a shape, a size, and a disposition form of the elastic member are not limited to the above embodiment. For example, in consideration of heat dissipation, an area in contact with the drive member may be enlarged. The elastic member may be disposed in a part other than a part between the driving device and the mass. As shown in the sixth embodiment, the elastic member may be disposed in a part in which no mass is disposed. Even if the cover member is not included, the elastic member may be disposed in the form shown in the fourth and fifth embodiments.

As a base material of the elastic member, in addition to polyurethane foam, a resin foam such as a polyethylene foam and a polypropylene foam or an elastomer foam can be used. In addition, for a solid body, a crosslinked rubber such as urethane rubber, silicone rubber, fluororubber, acrylic rubber, and acrylonitrile butadiene rubber, and various thermoplastic elastomers such as styrene, olefin, vinyl chloride, polyester, polyurethane, and polyamide elastomers may be used.

For the magnetic filler, for example, a ferromagnetic material such as iron, nickel, cobalt, gadolinium, and stainless steel, an antiferromagnetic material such as MnO, $Cr_2O_3$, $FeCl_2$, and MnAs, and alloys including these materials may be used. Among these, stainless steel, a copper iron alloy, or the like are preferable because they have excellent processability as a filler having high thermal conductivity. In addition, in consideration of improving heat dissipation, composite particles in which magnetic particles are attached to surfaces of thermally conductive particles having high thermal conductivity may be used as a magnetic filler. As a material for these thermally conductive particles, carbon materials, for example, graphite, expanded graphite, and carbon fibers are suitable. An alignment direction of the magnetic filler may be appropriately determined.

A material, a shape, and a mass of the mass are not particularly limited. For example, a mass of the mass may be adjusted according to a vibration frequency to be reduced. When the shape of the mass is a flat plate shape, since it can then be produced by press punching processing, this is suitable in consideration of ease of production and costs.

A material, a shape, and the like of the cover member are not particularly limited. As a material of the cover member, a metal, a resin, an elastomer, and the like may be exemplified. For example, an ABS resin, a polypropylene (PP) resin, a polyamide (PA) resin, an olefin elastomer (TPO), a styrene elastomer (TPS), a urethane elastomer (TPU), natural rubber (NR), ethylene-propylene-diene rubber (EPDM), nitrile rubber (NBR), chloroprene rubber (CR), butyl rubber (IIR), silicone rubber (Q), and the like are suitable. In addition, a material obtained by mixing various reinforcing materials with the above materials and a composite material of the above materials and other materials may be used. The cover member may be disposed so that it covers the entire perimeter of the driving device including the elastic member and the mass therein. In this case, a box shape, a cylindrical shape with a bottom, or the like may be formed according to the shape of the driving device.

EXAMPLES

Figure 10:
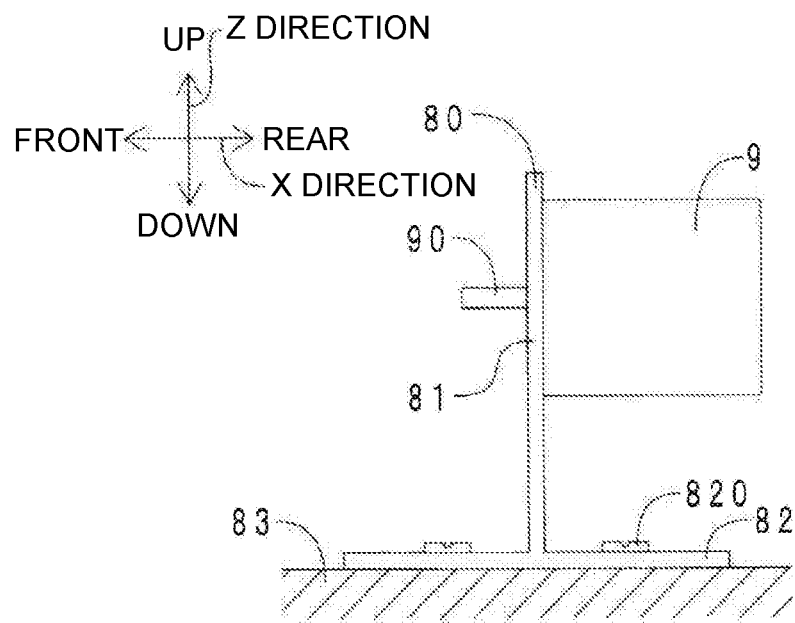
FIG. 10 is a right side view of a motor attached to a bracket.

The soundproof member of the present disclosure was mounted on a motor and a vibration reduction effect was checked. The motor was attached to a bracket in a cantilever form. FIG. 10 shows a right side view of the motor attached to the bracket. As shown in FIG. 10, a bracket 80 included an attaching part 81 and a fixed part 82. The attaching part 81 had a flat plate shape and was disposed vertically in the up and down direction. In the vicinity of the center of the attaching part 81, a circular opening was drilled. The fixed part 82 had a flat plate shape, and horizontally extended forward and rearward from the lower end of the attaching part 81. The fixed part 82 was fixed to a seat surface 83 by a screw 820. The motor 9 was screwed to the rear surface of the attaching part 81. The rotation shaft 90 of the motor 9 was inserted into the opening of the attaching part 81.

In order to check a vibration reduction effect, the soundproof member was mounted on one surface of the motor 9 (details will be described below), and an inertance when one surface of the motor 9 was struck with an impact hammer was measured. An acceleration pickup (not shown) was attached to a struck surface of the motor 9. The acceleration pickup was connected to a fast Fourier transform (FFT) analyzer. In this example, a "4507C" (commercially available from Brüel & Kjaer (B&K) was used as the acceleration pickup. In addition, a "PLUSE/Labshop" (commercially available from Brüel & Kjaer) was used as the FFT analyzer.

Two types of inertance were measured by changing a striking direction. First, a left surface of the motor 9 was struck by the impact hammer from the left side of the motor 9 (striking in the Y direction), and an inertance of the motor 9 in the Y direction was measured. Second, an upper surface of the motor 9 was struck by the impact hammer from the upper side of the motor 9 (striking in the Z direction), and an inertance of the motor 9 in the Z direction was measured. The inertance is a value obtained by calculating A/F when an exciting force applied to the motor 9 was set as F and an acceleration generated at a measurement point on the motor 9 (a disposition point of the acceleration pickup) was set as A. The inertance is an index that represents the responsiveness of a vibration level with respect to a unit exciting force, and a higher value of the inertance indicates greater vibration when the motor is operated. The configuration of the soundproof member used and an attachment position will be described below.

(1) Example 1

A soundproof member having the same configuration as in the first embodiment was mounted at the same position (a right surface of the motor: X-Z plane) as in the first embodiment (refer to FIG. 1 and FIG. 2 described above). In the soundproof member of Example 1, a resonance frequency in the Z direction matched a resonance frequency (320 Hz) of the motor in the Y direction.

(2) Example 2

A soundproof member having the same configuration as in the second embodiment was mounted at the same position (upper surface of the motor: X-Y plane) as in the second embodiment (refer to FIG. 4 described above). In the soundproof member of Example 2, a resonance frequency in the Y direction matched a resonance frequency (122 Hz) of the motor in the Z direction.

(3) Example 3

A soundproof member having the same configuration as in the first embodiment except that a size of the elastic member and a mass of the mass were changed was mounted at the same position (right surface of the motor: X-Z plane) as in the first embodiment. In the soundproof member of Example 3, a resonance frequency in the Z direction matched a resonance frequency (122 Hz) of the motor in the Z direction.

(4) Comparative Example 1

A single motor on which no soundproof member was mounted was used as Comparative Example 1.

(5) Comparative Example 2

A soundproof member was formed using an elastic member containing no magnetic filler and made of a polyurethane foam. An attachment position of the soundproof member was the same (right surface of the motor: X-Z plane) as in the first embodiment. In the soundproof member of Comparative Example 2, a resonance frequency in the Y direction matched a resonance frequency (320 Hz) of the motor in the Y direction.

(6) Comparative Example 3

A soundproof member was formed using an elastic member containing no magnetic filler and made of a polyurethane foam. An attachment position of the soundproof member was the same (upper surface of the motor: X-Y plane) as in the second embodiment. In the soundproof member of Comparative Example 3, a resonance frequency in the Z direction matched a resonance frequency (122 Hz) of the motor in the Z direction.

In Table 1, details of an attachment surface of the soundproof member, resonance frequencies in the Y direction and the Z direction, the elastic member constituting the soundproof member, and the mass are summarized. In Table 1, the spring constant of the elastic member is a value obtained by multiplying a dynamic spring constant measured in a standard sample with the same thickness by a proportion of the contact area. The shape of the standard sample with which a dynamic spring constant was measured was a cylindrical shape (contact area: 1962.5 mm$^2$) with a diameter of 50 mm in Examples 1 to 3 and was a rectangular columnar shape (contact area: 1600 mm$^2$) of 40 mm square in Comparative Examples 2 and 3. Here, the dynamic spring constant is a spring constant in a vibration state, and is an "absolute spring constant" in JIS K 6394: 2007 or SRIS-3503 (The Society of Rubber Industry, Japanese standard). The dynamic spring constant is a value measured at a vibration frequency of 100 Hz when the standard sample was compressed in the Y or Z direction at a compression ratio of 5% according to a non-resonance method defined in JIS K 6394: 2007.

TABLE 1

| | | Elastic member | | | | Y direction | | Z direction | |
|---|---|---|---|---|---|---|---|---|---|
| | Attachment surface of soundproof member | Alignment direction of magnetic filler | Size of elastic member length × width × thickness [mm] | Contact area [mm$^2$] | Mass of mass [g] | Spring constant of elastic member [N/mm] | Resonance frequency [Hz] | Spring constant of elastic member [N/mm] | Resonance frequency [Hz] |
| Example 1 | X-Z plane | Y (thickness) direction | 28.3 × 28.3 × 3 | 800.9 | 25 | 501.0 | 712.5 | 87.8 | 298.2 |
| Example 2 | X-Y plane | Y (planar) direction | 23.8 × 23.8 × 3 | 566.4 | 56 | 38.4 | 131.8 | 89.0 | 200.6 |
| Example 3 | X-Z plane | Y (thickness) direction | 15.8 × 15.8 × 3 | 249.6 | 56 | 156.2 | 265.8 | 27.4 | 111.2 |

TABLE 1-continued

| | | Elastic member | | | | Y direction | | Z direction | |
|---|---|---|---|---|---|---|---|---|---|
| | Attachment surface of soundproof member | Alignment direction of magnetic filler | Size of elastic member length × width × thickness [mm] | Contact area [mm²] | Mass of mass [g] | Spring constant of elastic member [N/mm] | Resonance frequency [Hz] | Spring constant of elastic member [N/mm] | Resonance frequency [Hz] |
| Comparative Example 2 | X-Z plane | — | 20.8 × 20.8 × 10 | 432.6 | 9.85 | 37.6 | 310.8 | — | — |
| Comparative Example 3 | X-Y plane | — | 10 × 30 × 10 | 300 | 31.14 | — | — | 19.2 | 125.0 |

Figure 11:
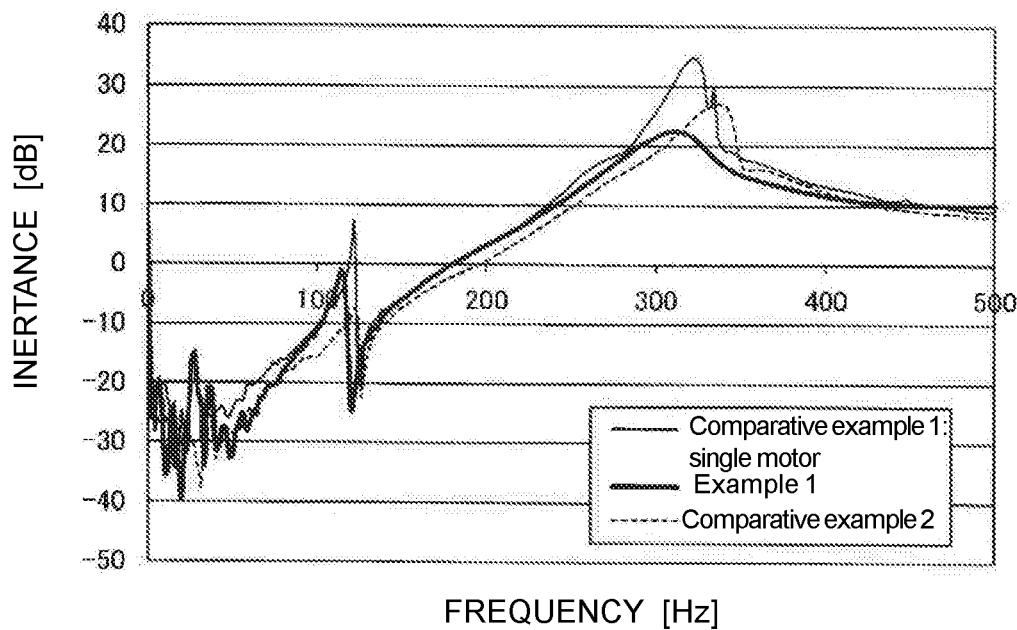
FIG. 11 is a graph showing measurement results of an inertance in a Y direction with respect to striking in the Y direction.
Figure 12:
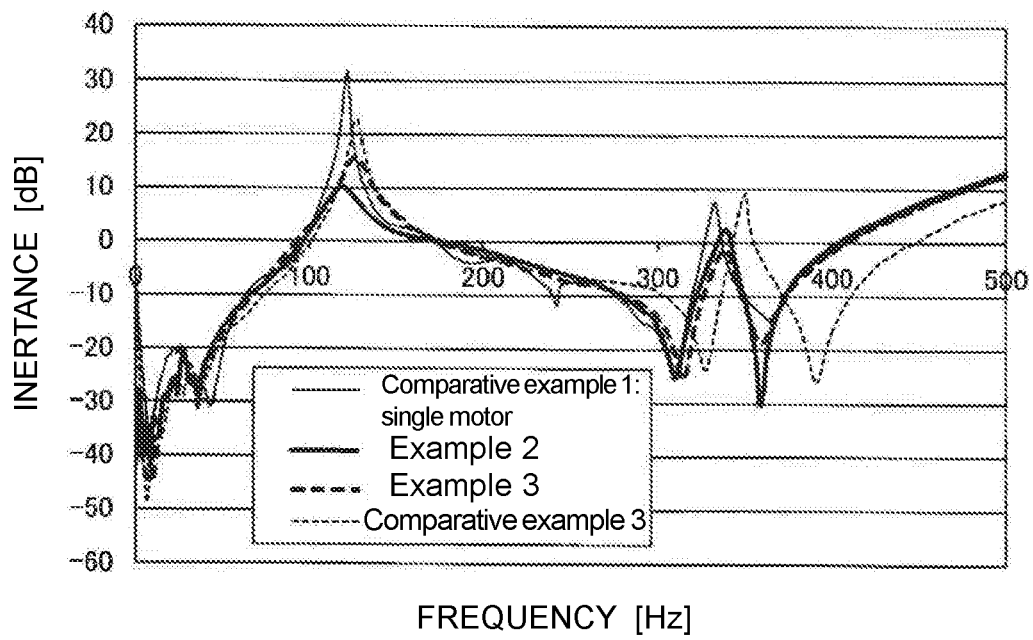
FIG. 12 is a graph showing measurement results of an inertance in a Z direction with respect to striking in the Z direction.

FIG. 11 shows measurement results of the inertance in the Y direction with respect to striking in the Y direction. FIG. 12 shows measurement results of the inertance in the Z direction with respect to striking in the Z direction.

As shown in FIG. 11, when vibration was applied in the Y direction, a peak of the inertance in the Y direction in a single motor (Comparative Example 1) was about 320 Hz. According to the motor with the soundproof member of Example 1, a peak value of the inertance near 320 Hz significantly decreased. On the other hand, according to the motor with the soundproof member of Comparative Example 2 including the elastic member containing no magnetic filler, a peak of the inertance was simply shifted to the high-frequency side, and the peak value hardly decreased.

As shown in FIG. 12, when vibration was applied in the Z direction, a peak of the inertance in the Z direction in a single motor (Comparative Example 1) was about 122 Hz. According to the motor with the soundproof members of Examples 2 and 3, a peak value of the inertance near 122 Hz significantly decreased. When comparing Examples 2 and 3, the soundproof member of Example 2 which was mounted on the X-Y plane of the motor and in which a resonance frequency in a direction shifted by 90° matched a vibration damping resonance frequency had a significantly lower peak value. On the other hand, according to the motor with the soundproof member of Comparative Example 3 including the elastic member containing no magnetic filler, a peak of the inertance was simply shifted to the high-frequency side, and the peak value hardly decreased. Accordingly, it was confirmed that, when the soundproof member of the present disclosure was used, it was possible to reduce low-frequency noise.

The invention claimed is:

1. A soundproof member mounted on a driving device including a rotating body, the soundproof member comprising:
    an elastic member comprising a base material made of a resin or an elastomer and a magnetic filler that is linked and aligned in one direction in the base material; and
    a mass that is disposed on a surface that extends in a rotation axis direction of the rotating body with the elastic member therebetween, and the mass is supported by the elastic member, wherein, when the rotation axis direction of the rotating body in the driving device is defined as an X direction, and in two directions orthogonal to the X direction, a horizontal direction is defined as a Y direction, and a vertical direction is defined as a Z direction, the mass is disposed on only one surface of an X-Z plane or an X-Y plane of the driving device with the elastic member therebetween.

2. The soundproof member according to claim 1, wherein a resonance frequency of the driving device in the Y direction is different from a resonance frequency in the Z direction,
    when the mass is disposed on the X-Z plane, a resonance frequency of the soundproof member in the Z direction matches the resonance frequency of the driving device in the Y direction, and
    when the mass is disposed on the X-Y plane, a resonance frequency of the soundproof member in the Y direction matches the resonance frequency of the driving device in the Z direction.

3. The soundproof member according to claim 1, wherein vibration damping frequencies of the driving device in the Y direction and the Z direction are 500 Hz or less.

4. The soundproof member according to claim 1, wherein the magnetic filler contained in the elastic member is linked and aligned in the Y direction.

5. The soundproof member according to claim 1, further comprising:
    a cover member that covers the elastic member and the mass.

6. The soundproof member according to claim 2, wherein vibration damping frequencies of the driving device in the Y direction and the Z direction are 500 Hz or less.

7. The soundproof member according to claim 2, wherein the magnetic filler contained in the elastic member is linked and aligned in the Y direction.

8. The soundproof member according to claim 3, wherein the magnetic filler contained in the elastic member is linked and aligned in the Y direction.

9. The soundproof member according to claim 2, further comprising:
    a cover member that covers the elastic member and the mass.

10. The soundproof member according to claim 3, further comprising:
    a cover member that covers the elastic member and the mass.

11. The soundproof member according to claim 4, further comprising:
    a cover member that covers the elastic member and the mass.

* * * * *